Figure 1:
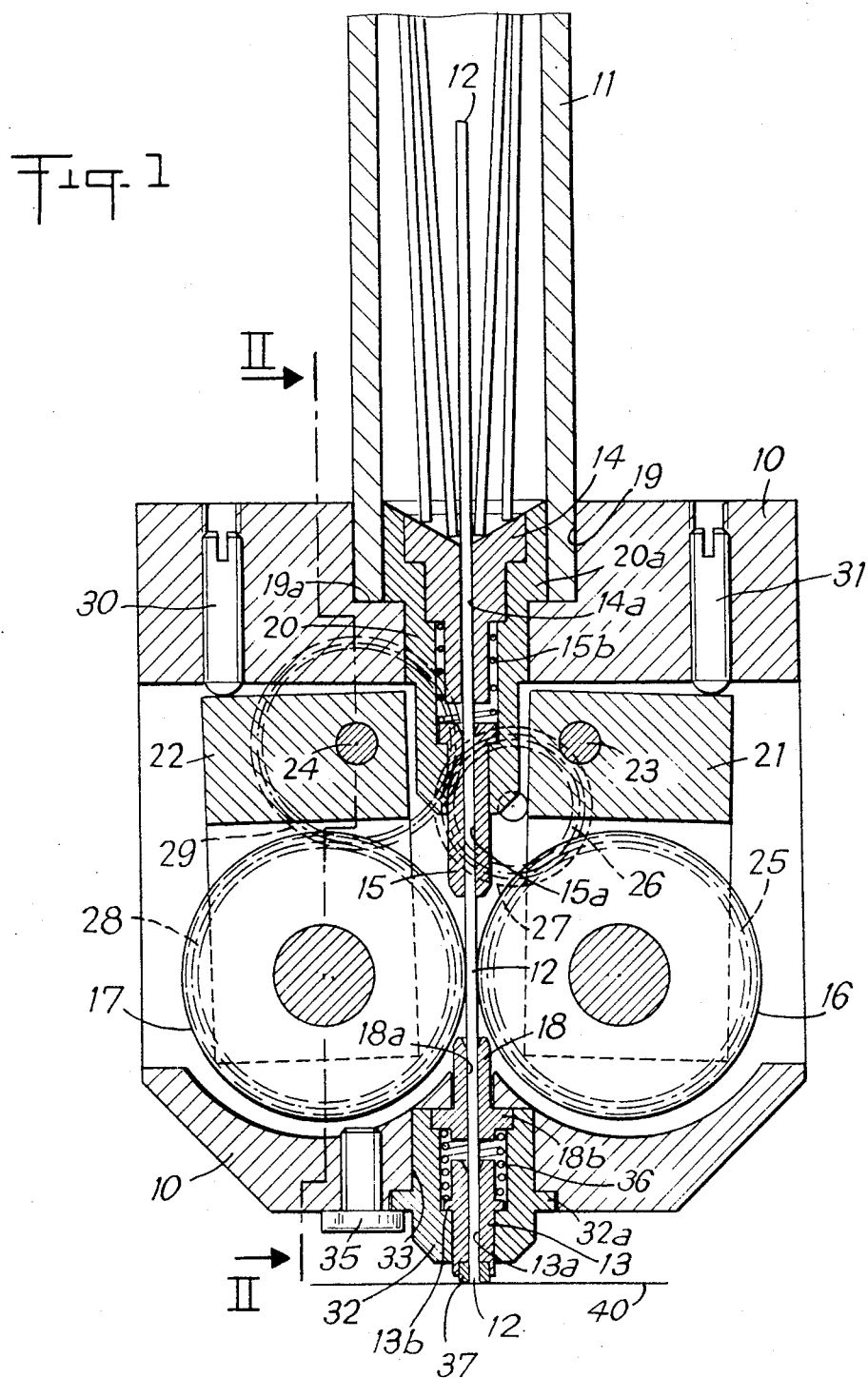

United States Patent [19]

Roche

[11] Patent Number: 4,540,995
[45] Date of Patent: Sep. 10, 1985

[54] PENCIL DEVICE FOR PLOTTING MACHINE

[75] Inventor: Michel Roche, Courtry, France

[73] Assignee: Benson S.A., Creteil, France

[21] Appl. No.: 597,778

[22] Filed: Apr. 6, 1984

[30] Foreign Application Priority Data

Aug. 4, 1983 [FR] France ............................. 83 05776

[51] Int. Cl.³ ............................................. G01D 15/24
[52] U.S. Cl. .................................. 346/139 C; 33/18 R
[58] Field of Search ................. 346/139 R, 139 C; 33/18 R; 401/53, 57, 85, 89, 90, 55

[56] References Cited

U.S. PATENT DOCUMENTS 4,015,269 3/1977 Edo ................................. 346/139 C

FOREIGN PATENT DOCUMENTS 838351 6/1981 U.S.S.R. .

Primary Examiner—Joseph W. Hartary
Attorney, Agent, or Firm—Kenneth Olsen; Thomas Langer; William B. Kempler

[57] ABSTRACT

A pencil device for a plotting machine comprises a housing (10) including a barrel (13) with a passage (13a) therethrough for receiving a lead (12) said passage having an exit for the lead at a forward end of said barrel; lead feeding means (11, 14, 15) located in said housing for containing spare leads and for continuously feeding the passage of said barrel with a lead; lead driving means (16, 17) for pressing the lead located in the passage against the recording medium during a writing operation; and means (36) for urging the forward end of the barrel in contact with the recording medium so that a consumed lead is replaced by a new lead without interrupting a trace being produced.

17 Claims, 2 Drawing Figures

PENCIL DEVICE FOR PLOTTING MACHINE

The present invention relates to a pencil device for a plotting machine, more particularly a pencil device of the type comprising a guide tube or barrel providing a passage for a pencil lead and means intended during a writing operation, to exert on a lead positioned in the barrel a substantially constant force in order to press such lead against a recording medium located in the direction of the exit of the passage.

Use of leads in automatic plotting machines offers several advantages. They permit great plotting speed, last a long time and require no drying time which allows the plotted document to be removed from the machine immediately.

There are known mechanical pencils with quasi-continuous feed of the lead from a magazine of leads. However, moving the lead forward progressively as it is consumed has to be manually controlled, which excludes the use of such mechanical pencils for automatic plotting machines.

A pencil device of the type cited above for a plotting machine and provided with automatic forward movement of the lead is described in U.S. Pat. No. 3,971,036. Several leads are arranged in a magazine in the form of a small barrel. A lead is brought into the working position by rotating the magazine and, during a plotting operation, such lead is held continuously against the recording medium by means of a pushing device acting upon the rear end of the lead. Forward movement of the lead as it is used is well provided for but, on the other hand, writing continuity is not ensured at the time of transition from one lead to the other.

Moreover, such writing continuity is not possible with known mechanical pencils since, in these pencils, the transition from one lead to the other can only be effected by actuating the forward movement mechanism when the propelling pencil is retracted.

An object of the present invention is to provide a pencil for a plotting machine in which there is no interruption in writing when making the transition from one lead to the other.

This object is attained according to the invention by a pencil device for use with a plotting machine to produce a trace on a recording medium when said pencil device is moved on the recording medium during a writing operation, comprising:

a housing comprising barrel means with passage means therethrough for receiving a lead, said passage means having an exit for the lead at a forward end of said barrel means;

lead feeding means located in said housing for containing spare leads and for continuously feeding said passage means with a lead;

lead driving means in said housing for pressing said lead located in said passage means against said recording medium during the writing operation; and means for urging the said forward end of said barrel means in contact with said recording medium whereby a comsumed lead is replaced by a new lead without interrupting a trace being produced.

Owing to the combination of the lead driving means with the means for urging the forward end of the barrel in contact with the recording medium, the transition from one lead to the other is effected without discontinuity in writing since the first lead can be used to the end without the residual stub end breaking or falling out and is followed without interruption by the next lead.

Pressing the lead currently being used against the recording medium is effected by applying a substantially constant longitudinal force to the lead towards the recording medium. The lead driving means comprises for example a pair of friction drive rollers rotatably driven by a constant torque motor, the friction drive rollers engaging side portions of the lead located in the barrel means or of another lead following it.

The lead feeding means comprises storage means for containing spare leads; and channeling means having a passage way substantially vertical in the operating condition thereof for channeling leads one by one by gravity from the storage means towards the passage means. The barrel is preferably mounted for limited longitudinal movement in the housing and biasing means are interposed between the housing and the barrel means to urge the forward end of the barrel means in contact with the recording medium.

According to another aspect of the invention a pencil device is provided which is easily and quickly controllable for initiating or discontinuing a plotting operation.

This object is attained by a pencil device of the type defined comprising a housing comprising barrel means with passage means therethrough for receiving a lead, said passage means having an exit for the lead at a forward end of said barrel means;

lead feeding means located in said housing for containing spare leads and for continuously feeding said passage means with a lead; and lead driving means in said housing for pressing said lead located in said passage means against said recording medium during the writing operation, said lead driving means being selectively controllable for releasing the pressure on said lead thereby discontinuing the production of a trace on the recording medium.

Figure 2:
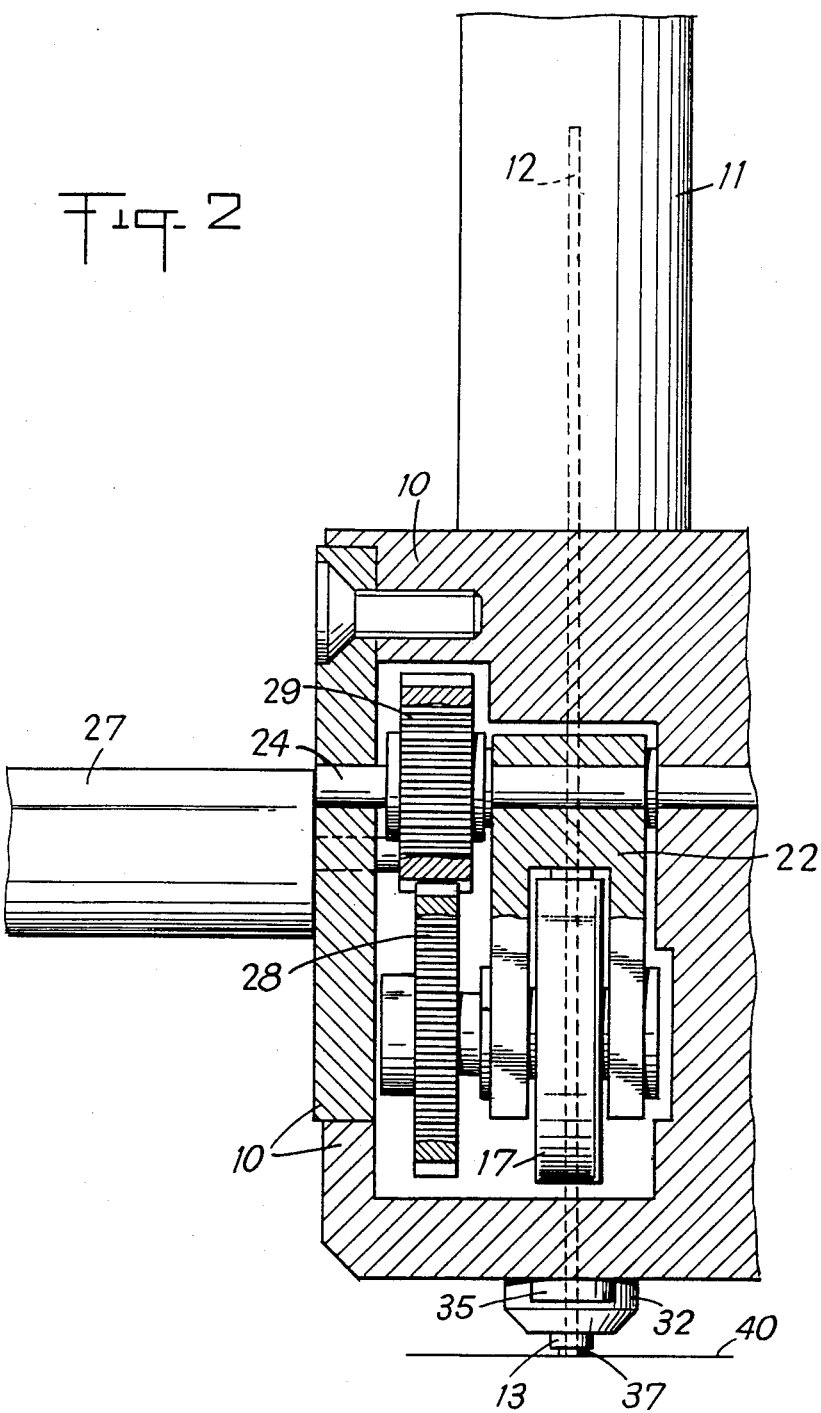

Other features and advantages of the pencil device according to the present invention will be best understood from the description below, of a non limitative embodiment, in reference to the enclosed drawings in which:

FIG. 1 is a sectional view of one embodiment of a pencil device in accordance with the invention and FIG. 2 is a partial sectional view along the line II—II in FIG. 1.

The pencil device shown in FIGS. 1 and 2 comprises a housing 10 having on top a storage tube or magazine 11 of leads 12 and underneath, a barrel 13, and which has a vertical channel providing communication between the magazine 11 and the barrel entrance 13. Along this channel between the magazine 11 and the barrel 13 are guiding means comprising in succession a funnel portion 14, a first guide tube 15, and a second guide tube 18.

The funnel portion 14 and the tube 15 are mounted in a sleeve 20 inserted into the channel formed in the housing 10. This channel opens out upwards in a part 19 which is wider and connected by a step 19a to the rest of the channel. The upper part of the sleeve 20 has a shoulder piece 20a resting on the step 19a and defines, with the internal wall of the upper part 19 of the channel formed in the housing 10, a ring-shaped seat for the base of the lead magazine 11. Within the sleeve 20 there are several parts having different diameters forming steps which support the upper heads of the funnel portion 14 and of the tube 15. The funnel portion 14 is tightly inserted in the sleeve 20, which is itself fixed into the vertical channel of the casing 10. The upper face of the funnel portion 14 forms a cone at the bottom of which there is a vertical passage 14a of diameter approximately equal to that of a lead 12. This passage 14a emerges opposite the central passage 15a of the tube 15 and has the same diameter as the passage 15a. The tube 15 is mounted for limited longitudinal movement into the sleeve 20 and is kept in a low position by means of a spring 15b interposed between the funnel portion 14 and the head of the guide tube 15.

The tube 15 emerges at the bottom into an enlarged space in which two friction drive rollers 16 and 17 are located. The rollers are mounted in blocks 21, 22 respectively, the blocks mounted in turn in the housing 10 around horizontal pivotal axes 23, 24. The roller 16 is fixed to a pinion wheel 25 which meshes with pinion wheel 26 mounted on the output shaft of a constant torque motor 27. Roller 17 is fixed to another pinion wheel 28 which is driven by the pinion 26 by interposing an additional pinion 29 in such manner that the rollers 16, 17 turn in opposite directions with the same peripheral speed. The additional pinion wheel 29, which rotates freely, is mounted on the pivotal axis 24 in block 22. The positions of the blocks 21, 22 round their pivotal axes can be adjusted by means of screws 30, 31 screwed into the housing 10 and of which the lower ends abut against the upper faces of the blocks 21, 22 near the outside edge of the blocks. By turning the screws 30 and 31, it is possible to move the blocks about their pivotal axes so as to position the rollers 16 and 17 in such a way that the distance between them is in alignment between the hole 14a and the channel 15a. Again by turning the screws 30 and 31, it is possible to regulate the distance between the rollers 16 and 17, and at the same time, the pressure exerted by the rollers on a lead passing between them. Rollers 16, 17 may be made of a substance such as polyurethane, for example.

The second guide tube 18, of which the upper end emerges in the enlarged space containing rollers 16 and 17, has a flange 18b fixing it between a ring 32 and the bottom of a seat 33. The ring 32 is inserted in the seat 33 and also has a flange 32a against which rest the heads of bolts 35 fixing the ring 32 in the seat 33.

The barrel 13 is mounted in the ring 32, on the bottom of which it is supported by a flange 13b. The lower part of the barrel 13 projects outside the ring 32, the barrel 13 being urged permanently down by means of a spring 36 interposed between the guide tube 18 and the flange 13b. A wear-resistant stone 37, for example sapphire, is embedded in the lower end of the barrel 13. A passage 13a passes vertically through the barrel 13 and the stone 37. Passage 13a is aligned with passage 18a of the tube 18 and with passages 14a and 15a, all these passages having the same diameter corresponding to that of the leads 12. It should be noted that the upper ends of the passages 15a, 18a and 13a are flared out slightly to facilitate introduction of the leads.

Functioning of the pencil device described above is as follows.

A lead 12 or several leads placed end to end normally occupy the vertical passage way between the magazine 11 and the barrel exit 13. When actually writing, the barrel 13 is urged in contact with the recording medium 40, for example a sheet of paper and traces are produced by the forward end of the lead held in the barrel. The pressure necessary for producing a trace and forward movement of such lead as it is progressively used are provided by the rollers 16 and 17 which, driven by the constant torque motor 27, apply a substantially constant force to such lead either directly or through the intermediary of a following lead. The leads are continuously fed one by one to the barrel 13 because the leads 12 contained in the magazine, through the force of gravity, one after the other reach the passage 14a in the funnel portion 14, and from there, after passing through the passage 15a are engaged by friction drive rollers 16, 17. When the rear end of a lead 12 has entered the passage 14a, the forward end of another lead 12, guided by the funnel portion 14, slides into the passage 14a behind the preceding lead, ensuring continuity of feed into the passage 14a, then the passages 15a, 18a and 13a. Total usage of each lead before commencement of use of the succeeding lead is thus made possible without interrupting the writing operation.

Retraction of the lead 12 at the end of an actual writing operation is effected by applying a pulse signal to the motor 27 in the opposite polarity to the plotting signal. The motor then rotates for a short time in the reverse direction retracting the lead held between the rollers 16 and 17. It is possible that such lead is different from the stub-end present at the exit of the barrel 13; such stub-end therefore "floats" on the surface of the recording medium 40, but, because of its very light weight, does not produce a trace on this medium. It will be noted moreover that the arrangement of the guide tube 15 enables it to slide vertically upwards in relation to the sleeve 14, counter to the spring 15b. The spring 15b exerts a resistant force just sufficient to maintain the tube 15 in the low position during the writing operation but insufficient to overcome any movement of the tube 15 at the time of retraction. Any risk of fracture of the lead at the point of exit from the tube 15 is eliminated; a fracture which might otherwise be caused by the efforts resulting, for example, from a slight defect of alignment in conjunction with a sudden reversal of the direction of drive.

Various modifications and additions can of course be made to the form of embodiment described above of a pencil device in accordance with the invention without departing from the extent of protection conferred by the attached claims.

In particular, in order to avoid reduction in friction between the friction drive rollers and the leads as a result of graphite deposits on the rollers from the leads, the latter may be coated with a protective film, for example a film of varnish.

I claim:

1. A pencil device for use with a plotting machine to produce a trace on a recording medium when said pencil device is moved on the recording medium during a writing operation, comprising:
    a housing comprising barrel means with passage means therethrough for receiving a lead, said passage means having an exit for the lead at a forward end of said barrel means;
    lead feeding means located in said housing for containing spare leads and for continuously feeding said passage means with a lead;
    lead driving means in said housing for pressing said lead located in said passage means against said recording medium during the writing operation; and
    means for urging the said forward end of said barrel means in contact with said recording medium whereby a consumed lead is replaced by a new lead without interrupting a trace being produced.

2. The pencil device according to claim 1 wherein said barrel means is mounted for limited longitudinal movement with respect to said housing, said urging means comprising biasing means located between said housing and said barrel means for applying a biasing force to said barrel means to maintain said forward end in contact with said recording medium.

3. The pencil device according to claim 1 wherein said lead driving means comprises means for applying a substantially constant longitudinal force to said lead towards said recording medium during said writing operation.

4. The pencil device according to claim 2 wherein said lead driving means comprises means for applying a substantially constant longitudinal force to said lead towards said recording medium during said writing operation.

5. The pencil device according to claim 3 wherein said lead driving means comprises first and second friction drive rollers engaging side portions of a lead, and constant torque motor means for rotatably driving said rollers to apply said substantially constant longitudinal force to said lead.

6. The pencil device according to claim 5 wherein said lead feeding means comprises:
storage means for containing spare leads; and
channeling means having a passage way substantially vertical in the operating condition thereof for channeling leads one by one by gravity from the storage means towards the passage means.

7. The pencil device according to claim 6 wherein said channeling means further comprises guiding means for guiding the leads one by one from the storage means to an enlarged space of said housing located above said barrel means, said driving means being located in said enlarged space to engage the portion of lead located in said enlarged space.

8. The pencil device according to claim 7 wherein said lead driving means comprises first and second mounting means movably mounted in said housing for providing adjustable lateral positions relative to the lead in said enlarged space, said first and second friction drive rollers being rotatably mounted on said first and second mounting means respectively whereby the lateral position of each of said friction rollers can be adjusted relative to the lead located in said enlarged space.

9. The pencil device according to claim 8 wherein said torque motor means is controllable by a pulse signal for temporarily rotating said motor means in the reverse direction compared to the direction which presses said lead against said recording medium in order to discontinue the production of a trace on the recording medium.

10. The pencil device according to claim 9 wherein said guiding means is mounted for longitudinal movement relative to said housing; and further comprising
spring means for biasing said guiding means towards said friction drive rollers whereby said guiding means temporarily movable by said lead away from the recording medium when said motor means is temporarily rotated in the reverse direction by said pulse signal.

11. The pencil device according to claim 6 wherein said leads are coated with a film for preventing deposits of the lead material on the driving means.

12. The pencil device according to claim 7 wherein said leads are coated with a film for preventing deposits of the lead material on the driving means.

13. The pencil device according to claim 8 wherein said leads are coated with a film for preventing deposits of the lead material on the driving means.

14. The pencil device according to claim 9 wherein said leads are coated with a film for preventing deposits of the lead material on the driving means.

15. The pencil device according to claim 10 wherein said leads are coated with a film for preventing deposits of the lead material on the driving means.

16. A pencil device for use with a plotting machine to produce a trace on a recording medium when said pencil device is moved on the recording medium during a writing operation, comprising:
a housing comprising barrel means with passage means therethrough for receiving a lead, said passage means having an exit for the lead at a forward end of said barrel means;
lead feeding means located in said housing for containing spare leads and for continuously feeding said passage means with a lead; and
lead driving means in said housing for pressing said lead located in said passage means against said recording medium during the writing operation, said lead driving means being selectively controllable for releasing the pressure on said lead thereby discontinuing the production of a trace on the recording medium.

17. The pencil device according to claim 16 wherein said lead driving means comprises:
first and second friction drive rollers engaging side portions of said lead; and
constant torque motor means adapted to be energized by an electrical current of a first polarity for rotatably driving said rollers in a first direction to apply a substantially constant longitudinal force to said lead towards said recording medium, said constant torque motor means being controllable by an electrical pulse of opposite polarity for momentarily rotating said rollers in a reverse direction and retracting said lead to discontinue the production of a trace on the recording medium.

* * * * *